(12) United States Patent
Nehlen et al.

(10) Patent No.: US 11,140,887 B2
(45) Date of Patent: Oct. 12, 2021

(54) FISHING ROD END CAP WITH ADJUSTABLE INDICATORS FOR FISHING LINE CHARACTERISTICS

(71) Applicant: PRACTICAL ANGLING LLC, Cold Spring, NY (US)

(72) Inventors: Chris James Nehlen, Cold Spring Harbor, NY (US); Daniel McGarry, Carle Place, NY (US)

(73) Assignee: PRACTICAL ANGLING LLC, Cold Spring Harbor, NY (US)

( * ) Notice: Subject to any disclaimer, the term of this patent is extended or adjusted under 35 U.S.C. 154(b) by 209 days.

(21) Appl. No.: 16/577,020

(22) Filed: Sep. 20, 2019

(65) Prior Publication Data

US 2021/0084881 A1     Mar. 25, 2021

(51) Int. Cl.
*A01K 99/00*     (2006.01)
*A01K 87/02*     (2006.01)

(52) U.S. Cl.
CPC .............. *A01K 99/00* (2013.01); *A01K 87/02* (2013.01)

(58) Field of Classification Search
CPC ...................................................... A01K 99/00
See application file for complete search history.

(56) References Cited

U.S. PATENT DOCUMENTS

| | | | | |
|---|---|---|---|---|
| 4,203,565 A * | 5/1980 | Puryear | ................. | A01K 89/01 116/307 |
| 5,568,787 A * | 10/1996 | Forslund | ................ | A01K 89/00 116/307 |
| 5,924,639 A * | 7/1999 | Atherton | ............ | A01K 89/0111 242/322 |
| 6,564,495 B1 * | 5/2003 | Fehlig | .................... | A01K 91/00 43/4 |
| 8,695,269 B1 * | 4/2014 | Gray | ...................... | A01K 87/08 43/23 |
| 9,603,348 B2 * | 3/2017 | Hyun | ................. | A01K 89/0183 |
| 2006/0059765 A1 * | 3/2006 | Smith | ................. | A01K 87/007 43/25 |

* cited by examiner

*Primary Examiner* — Richard G Davis
(74) *Attorney, Agent, or Firm* — Ostrolenk Faber LLP

(57) ABSTRACT

An indicator assembly attachable to a butt end of a fishing rod includes a cylinder on which two information carrying rings are rotatable to selected positions. Each ring carries a plurality of information about the fishing line on that fishing rod. Each ring is rotatable on the cylinder to bring selected information to an indicator supported at the cylinder. A fastening element holds the elements of the assembly together.

7 Claims, 5 Drawing Sheets

FISHING ROD END CAP WITH ADJUSTABLE INDICATORS FOR FISHING LINE CHARACTERISTICS

BACKGROUND OF THE INVENTION

The present invention relates to an indicator assembly for placement on an end of a fishing rod to be used for identifying characteristics of the fishing line provided on the fishing line reel on the fishing rod.

A fishing rod typically is an assembly of a rod, a grip on one end of the rod for a fisherman to hold the fishing rod when fishing, a reel on the fishing rod for holding fishing line wound on the reel and from which the fishing line is to be dispensed into a body of water in which fish may be caught by fishermen on appropriate fishing hooks, lures, and the like on the leading end of the line.

Fishing line may be formed of any of various string like filament or like materials, which a fisherman might find best suited for a particular technique of fishing, such as fly fishing, surf fishing, et al. and for fishing for specific species of fish. Due to the different characteristics of a body of water in which the fishing is performed, e.g. flowing water, still water, surf, waves as in surf fishing, etc., and the characteristics of the fish, including size, weight, endurance and different ways the fish to be caught react to being caught on a hook fisherman chooses a suitable fishing line and may change the line he is using as he sees a change in fishing conditions.

Fishermen have learned of the usefulness of different materials and strengths of fishing lines that are preferably used for each technique of fishing, each type of fish being caught, conditions of the body of water being fished in, his experience in fishing, applicable literature and advice from other persons have taught fishermen which type of fishing line and particularly the material of the line to be used for the fishing, which strength line, i.e., which weight the line can bear without tearing, and other fishing techniques.

Fishing lines to be selected should satisfy two principal significant characteristics. First, the material of which the fishing line may be primarily comprised is typically selected from one of a fluorocarbon, a monofilament, a braid or a copolymer material. Secondly, the strength of the fishing line, typically measured in terms of the weight to which the line may be subjected without breaking is selected. Fishermen develop understanding of which one of each of those characteristics should be selected for a particular session of fishing.

Fishing lines used by fishermen have a wide variation as to the weight of a fish to be caught and the force that movement of the fish and conditions of the water in which fishing is occurring, weather, operating conditions at the location where fishing is performed, etc. affect the fishing line. These forces will be applied to a particular selected line. A line is selected to perform as expected when used for fishing under the various current ambient conditions and to maintain the line integrity without the line breaking or separating up to a particular weight or force applied on the line. There are, therefore, a wide range of available fishing line weight or force resisting capabilities that may range from as low as 5 lbs to over 50 lbs and higher and numerous weight level lines in between.

To accommodate anticipated and unanticipated variation in conditions for fishing, a fisherman may have available to him, while fishing, several fishing rods on each of which a fishing line reel has been attached. Each reel is wound with a respective fishing line of a selected one of the fishing line materials and a selected range of weight supporting or force resisting capability without the line breaking. The fisherman may select one of his prepared rods with a selected line on the reel. During the course of fishing, the fisherman may switch to another of the rods with its selected line on the reel in order to use the best type of line to catch the type of fish he wants to catch under the prevailing or perhaps changing conditions where the fisherman is fishing.

There are competitions among fishermen. Many of the competitions are organized. For example, in one type, the goal of each fisherman during the competition period is to catch the most fish of a particular kind or species, or in another type of competition to catch the greatest total weight of a specified number of fish caught within a specific period of time. Especially during such competitions, competing fishermen will keep on hand from several to many fishing rods, sometimes numbering tens of such rods, for example, or even thirty to fifty rods may be available for the fisherman to select one or another rod with a line of selected material and weight support during the competition for seeking maximum results. Particularly under those circumstances, but in less competitive fishing also, fishermen want to not only have an available supply of different fishing rods with a reel with a selected fishing line with different relevant characteristics, and also want to have the rods marked to indicate both the material of the fishing line and the weight the line can support. During the fishing competition, the fishermen can thereby rapidly select a particular set of characteristics that he then decides would provide the desired advantage.

Fishermen want immediately available information supplied to them about the characteristics of their fishing line. Leisure time fishermen and even experienced competitive fisherman may write the characteristics of the fishing line then on its reel onto each rod directly or on a tape or label applied to the rod. However, these markings may become directly erased during fishing, may be applied on a label attached by adhesive which may fall away during use, and otherwise become difficult to read. Also, if a fisherman has to change the indications applied on the fishing rod of the characteristics of the fishing line, this may be more time consuming than a fisherman wants to deal with in the foregoing circumstances.

SUMMARY OF THE INVENTION

It is an object of the invention to provide a selected, but easily applied or easily altered indication to a fishing rod, of a specific selected line material or fishing line weight or force resistance characteristic, without someone having to write that information directly on the rod or on a label or later having to reapply the information and to have that characteristic remain readily visible under normally expected circumstances, especially during a fishing competition, and to be able to easily and rapidly adjust the indicators of such characteristics by an appropriate mechanism.

To satisfy such an objective, the present invention provides an adjustable and selectable indicator assembly that is attachable preferably at or near the butt-end or hand-grip end of a fishing rod. That indicator assembly includes a listing of selectable materials of a fishing line and a selectable indication of the weight resistance of lines, up to which a fishing line can be used without tearing.

Accordingly, the present invention is comprised of an assembly of at least two indicators attached on a common support. Each indicator preferably comprises a rotatable dial on the common support with one dial indicating choices of line material another dial indicating the weight capability of the line. Each indication on the choice of line material and weight set on the instrument should be clearly visible when the respective rod is held.

The indicator assembly is preferably in an entire end cap which includes a combination of parts, described in detail below, which are supported on the common support that can be loosened to enable the indicator dials to be rotated or can be tightened to lock the dials in selected indication positions, and a clamping device which clamps the assembly to the butt of the fishing rod or is otherwise attached to the butt of the rod to position it there so that the fisherman can readily see the indicator dials.

The above described arrangement makes clear viewing of respective line indicators for each of the fishing lines on each of the rods, prevents accidental removal of indicators due to rubbing, presence of water, indicator bearing tape falling away, etc., and firmly fixes the indicator assembly of the invention in place.

Other features and advantages of the present invention will become apparent from the following description of the invention which refers to the accompanying drawings.

DESCRIPTION OF AN EMBODIMENT OF THE INVENTION

Figure 1:
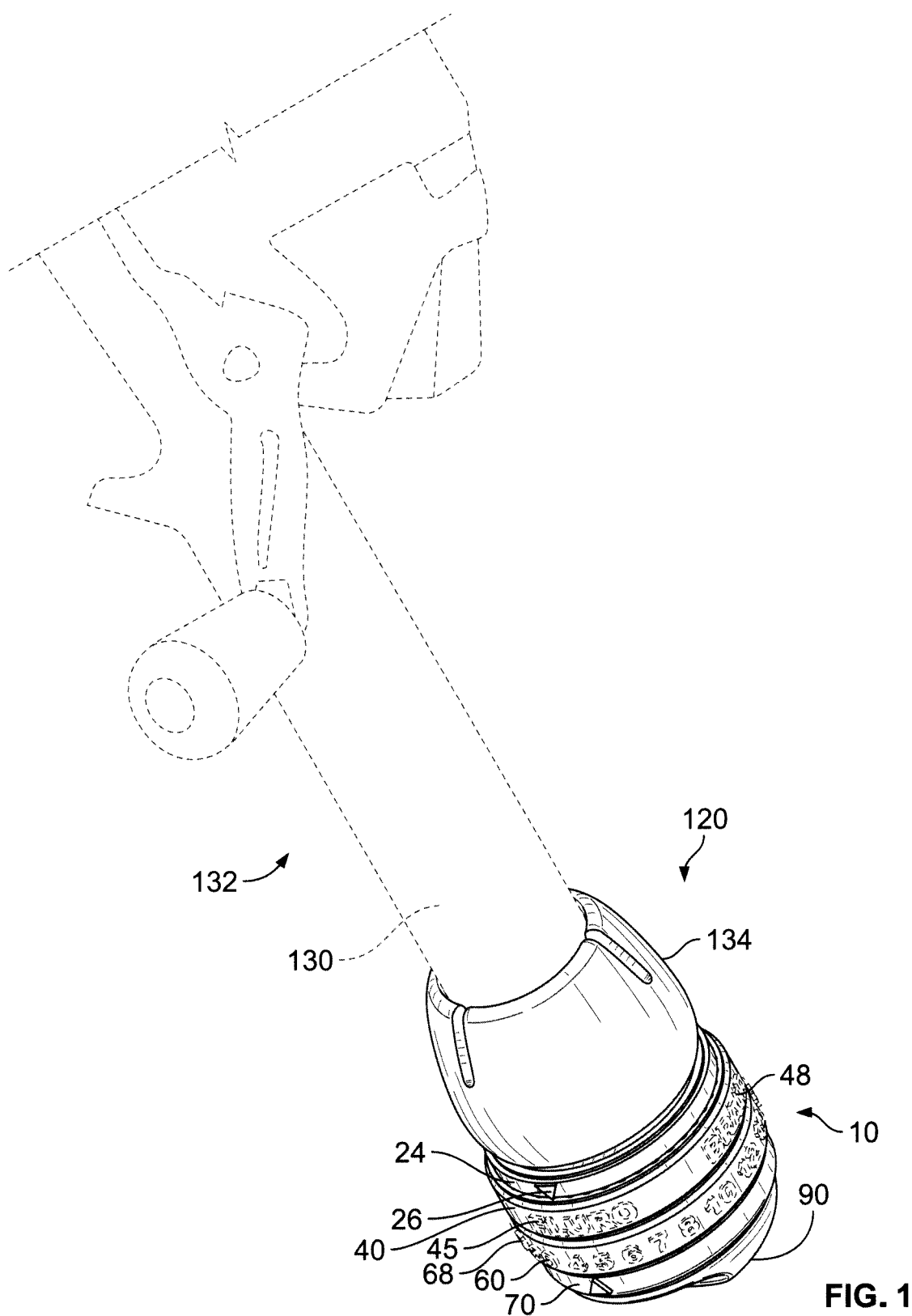
FIG. 1 is a perspective view of the indicator assembly of the invention shown attached to a fishing rod.

The broken line illustration in FIG. 1 depicts a butt end 12 of a fishing rod to which an indicator assembly 10 is attached. Broken lines on information indicating rings in all of the Figures depict informational characters on the peripheries of the rings. The information provided is a matter of choice.

Referring to the Figures, the indicator assembly 10, in the form of a fishing rod end cap described in the embodiment below, achieves the object of the invention. Several parts are assembled to define the indicator assembly 10, as shown in FIGS. 1, 2 and 5.

Figure 2:
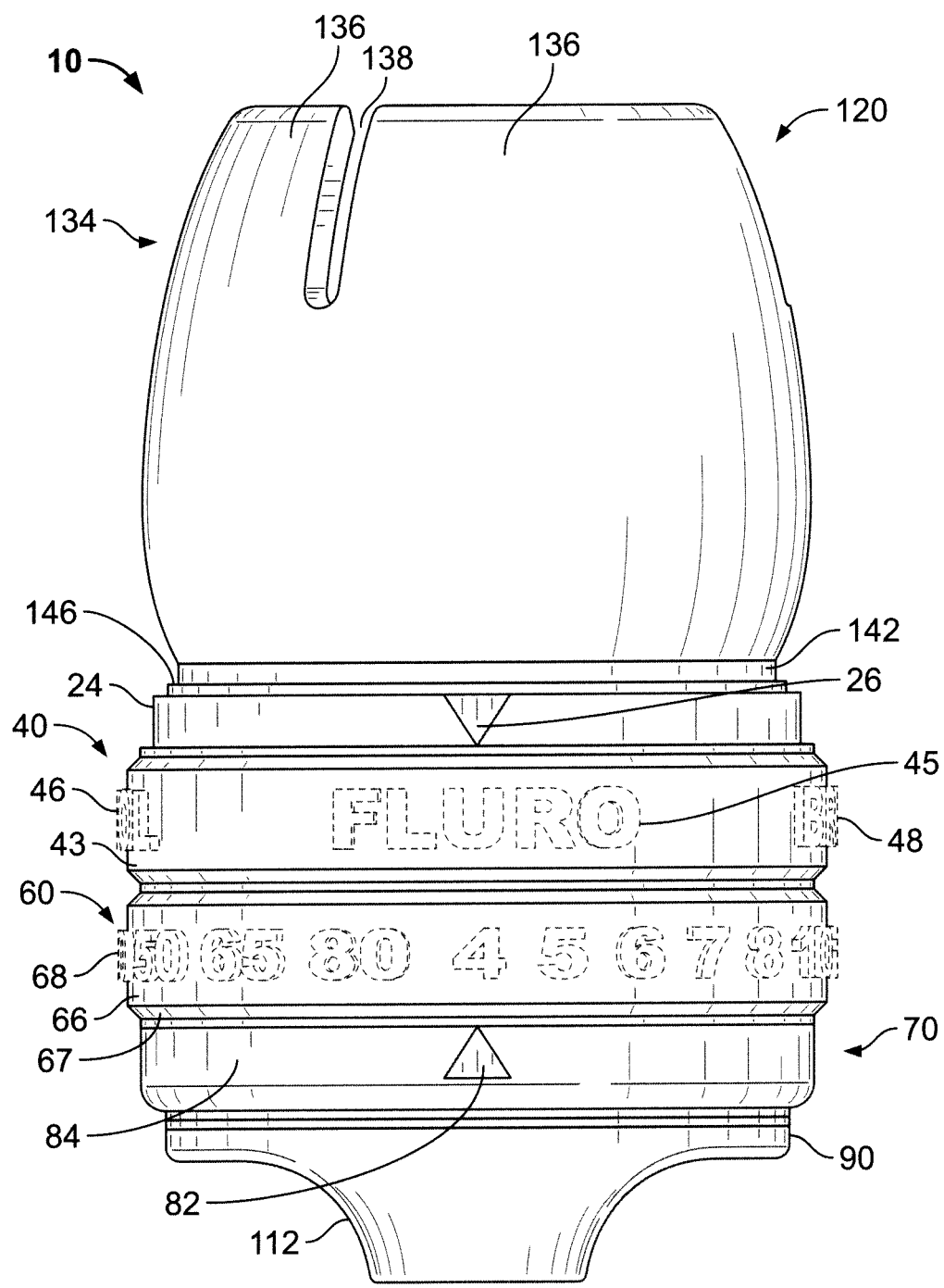
FIG. 2 is an elevational view of an assembled indicator assembly for a fishing rod according to the invention.
Figure 5:
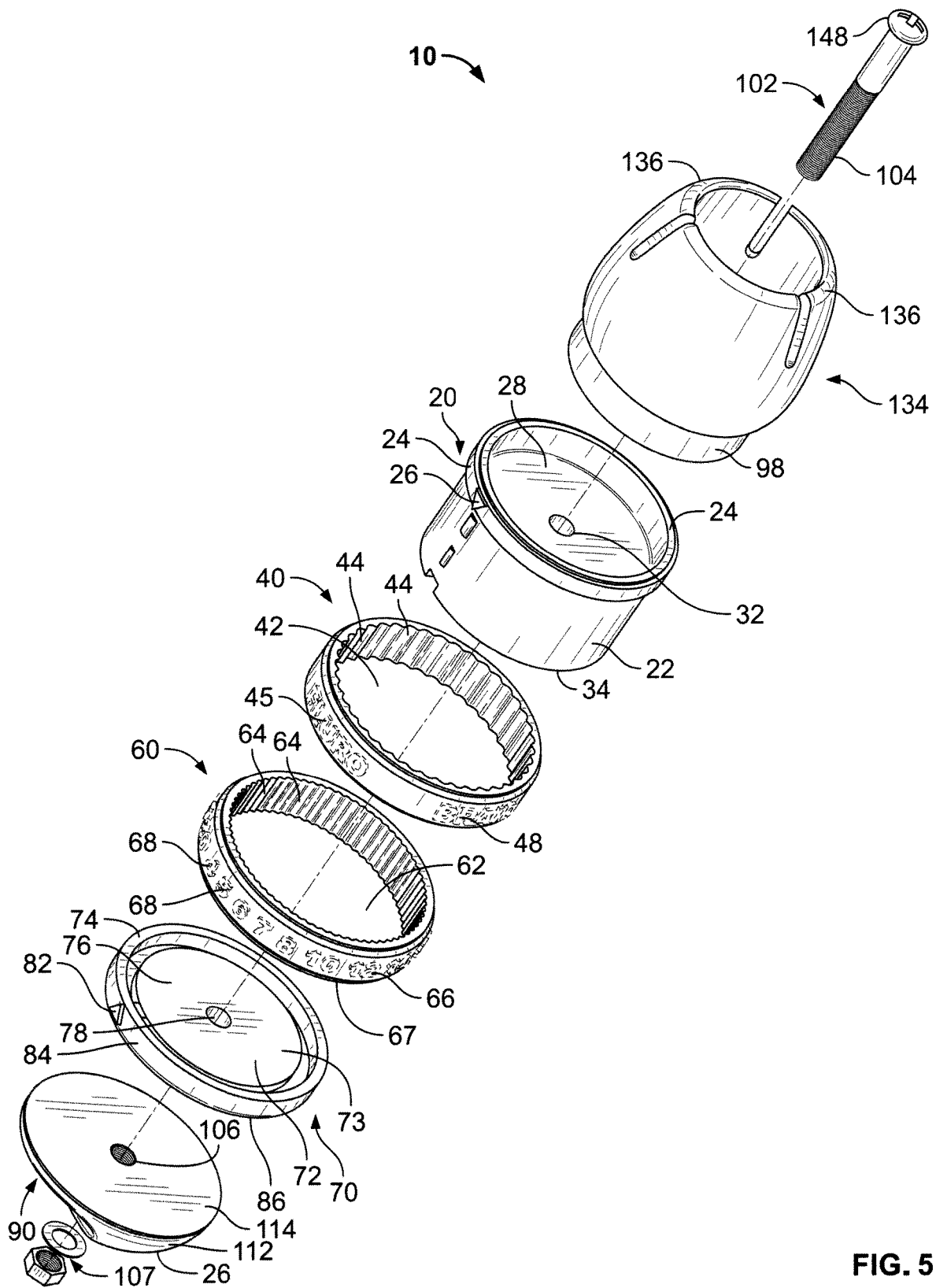
FIG. 5 is an exploded perspective view of the indicator assembly illustrating all of the component parts which are assembled to define the indicator assembly 10 shown in FIGS. 1, 2 and 5.

Referring to FIGS. 1, 2 and 5 the indicator assembly comprises a cylindrical body 20. The body 20 and its peripheral exterior 22 support and assemble together all of the elements of the assembly. The body 20 includes a collar 24 integral with a first end 24 of the body 20. At one location on its peripheral exterior, the collar 24 has an indicating element 26, shown in the general shape of a triangle, which points down toward a below described first information indicating ring 40 to indicate a selected information then on that ring at the indicating element. The surface 28 at the first end of the cylinder body 20 is configured to receive a below described mounting connector 98 of the indicator assembly to connect the assembly to the butt end of the fishing rod. The hole 32 at the center of the surface 28 of the cylinder defines a pathway for a connector bolt 102 which holds all of the elements of the indicator assembly together in their proper sequence and with their correct degree of securement.

The opposite, second bottom end of 34 of the cylinder 20 is received at the washer 70, described below.

The peripheral exterior surface of the cylinder 20 receives the below described first and second indicator information rings 40, 60 and the washer 70. A graspable fastening element 90 fastened on the cylinder 20 completes the indicator assembly 10.

The peripheral exterior 22 of the cylinder 20 is configured to cause resistance to, but not to prevent, rotation of the first and second information display rings 40, 60 that are rotatably supported on the peripheral exterior 22 of the cylinder 20. The exterior or periphery 22 of the cylinder 20 contacts the interiors of the indicator information rings 40, 60 enabling rotation of those rings on the cylinder periphery 22 to set each indicator ring to enable an indication of selected information on the indicator ring. The surface of the periphery 22 is illustrated as roughened, to cooperate with the internal peripheries of the rings 40, 60 for inhibiting, but not preventing, rotation of the rings 40, 60 on the cylinder. Alternatives to a roughened surface for inhibiting rotation may be used. One is particularly described next.

FIGS. 1, 2 and 5 show a first information indicating ring 40 on the periphery 22 and below the collar 24 of the cylinder and they show a second information indicating ring 60 positioned below the first ring 40 on the periphery of the cylinder 22.

FIG. 5, shows that the information indicating ring 40 is circular, with a central opening 42 sized to permit rotation of the ring on the periphery of the cylinder 20. Inside the opening 42 of the ring 40 are a series of teeth 44 or splines which project into the annulus. Their inward apices define an interior diameter sized to cause the apices to contact the periphery 22 of the cylinder 20. The size of the opening 42 defined at the apices 44 is selected with respect to the outer diameter of the cylinder periphery 22 so that their contact inhibits or resists rotation of the ring 40 around the periphery of the cylinder 20 without preventing that rotation. Other devices which inhibit, but do not prohibit, such rotation of ring 40 may be used. The height of the ring 40 along the cylinder 20, 36 is much shorter than the height of the cylinder, leaving space axially along the exterior of the cylinder for the elements below.

FIGS. 1, 2 and 5 show one set of a first plurality of four selected sets of indicia on the ring 40. Each set is shown as a word molded into or otherwise formed on the periphery 43 of the first information indicating ring 40 and the sets are at spaced intervals around the ring 40. Each of the four sets of indicia in this example indicates one of the materials of which the fishing line (not shown) wound on the reel may be comprised. Other indicia related to the fishing rod or to the fishing line may be provided on the periphery of the ring 40. Fluoro is illustrated by indicia 45 in FIG. 2 showing an abbreviation of fluoro carbon. Other sets of indicia also indicated on the periphery of the ring are respectively braid, mono for monofilament, and copol for copolymer. Three sets of indicia can be seen at 45, 46 and 48. Although a particular type and content of the indicia on the ring 40 are described, the assembly 10 is not limited to particular type of indicia.

The first information indicating ring 40 is installed with its top side 49 facing the collar 24 of the cylinder. The ring 40 is rotated until selected information on the ring 40 is below the indicator element 26 on the collar. The ring 40 is positioned to be viewed in the direction of view at which a user would see it when holding the fishing rod and observing the end cap on the fishing rod.

FIGS. 1, 2 and 5 show the next element in sequence on the cylinder, the second information indicating ring 60. It is placed next below the first information ring 40 along the cylinder periphery 22. The ring 60 also has an open interior 62 surrounded by teeth having apices 64. The diameter of the opening 62 is such that the apices 64 contact the periphery of the cylinder 22 such that this contact again inhibits rotation of the ring 60, without preventing rotation.

The periphery or exterior 66 of the second ring information indicating 60 is also provided with a plurality or a plurality of sets of molded in second indicia 68. The second indicia for example comprise numbers, spaced apart. The numbers are shown as being numbered five number units in sequence at the low end numbers and ten units in sequence at the high end numbers. The second indicia are intended to indicate weight or force resistance that can be applied to the particular fishing line on that reel without the line breaking or tearing and without losing the end of the line and losing whatever may have been caught by the hooks, etc. on the line. Part of the range of those indicia 68 molded into or otherwise formed on the periphery or exterior 66 of the information indicating ring 60 is visible in FIGS. 2 and 5.

As with the first ring 40, the indicia on the second information indicating ring 60 are not limited to those specifically disclosed. For that reason, those indicia are shown in broken lines. The indicia are present, but not restricted in contents.

Figure 3:
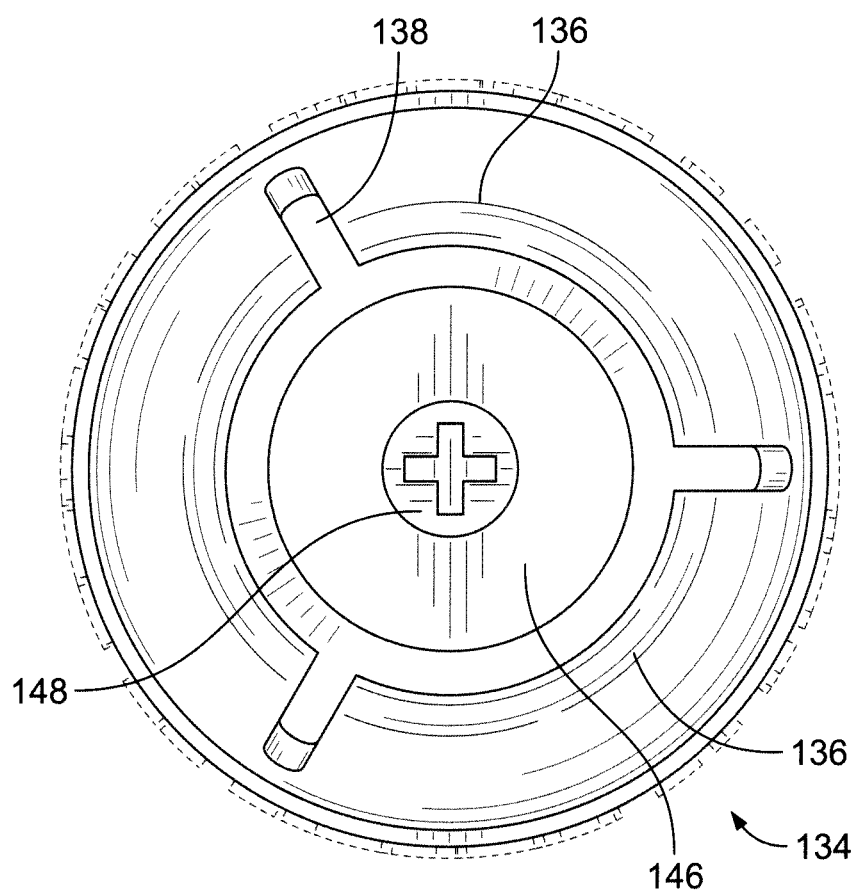
FIG. 3 is a top view of a fastening connector, which is illustrated at the top of FIG. 2.
Figure 4:
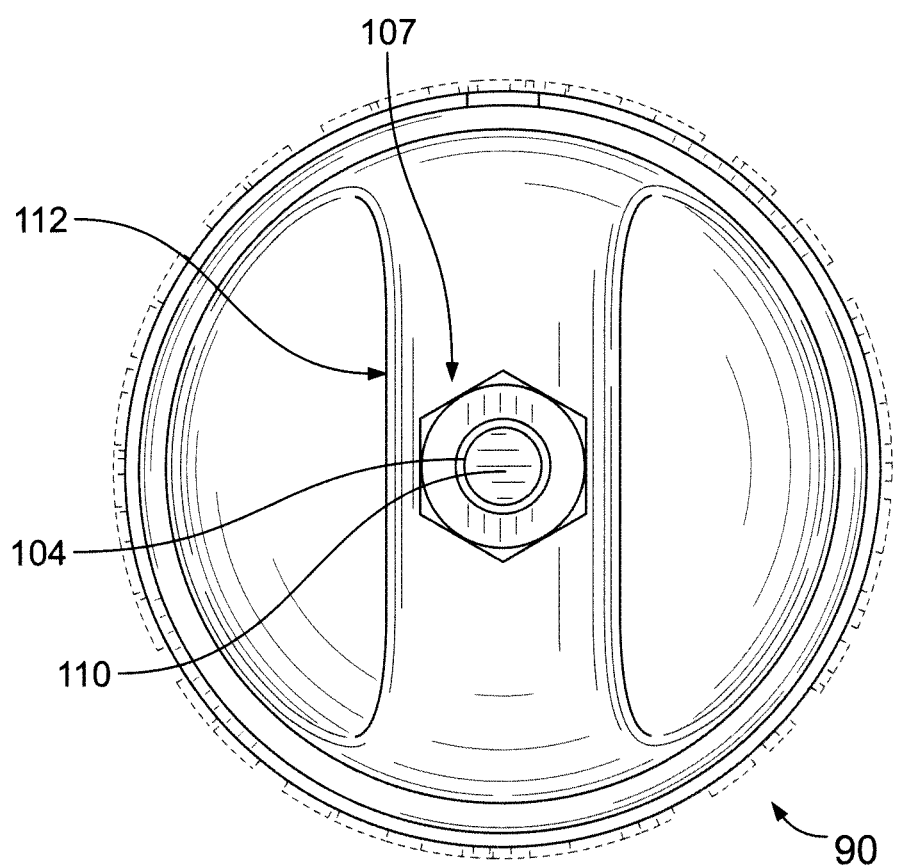
FIG. 4 is a bottom view of the indicator assembly.

FIGS. 3 and 4 show broken lines that indicate indicia on the peripheries of the rings that are seen in the directions of view of FIGS. 3 and 4.

The ring 60 is placed below and may rest against the ring 40 above it, but the rings are designed and are so located on the cylinder so as not to rotate together with each other. The ring 60 is oriented upright on the cylinder 20, so that the numbers or other information may be read in the same direction as the information on the ring 40 may be read. Although the rings 40 and 60 may, but need not be, in contact when they are assembled on the cylinder 20, their opposing surfaces would permit rotation of one ring around the periphery 22 of the cylinder 20 without the other ring being simultaneously rotated, so that one part of the information on one ring may be reset while another part of the information on the other ring is not reset. Both rings 40 and 60 together on the cylinder 20 are shorter in height than the height of the cylinder and are held between the ends of the cylinder.

FIGS. 1, 2 and 5 show the next part in sequence, which is a combined washer and indication assembly holder 70. The washer is a disk 72 and does not have an interior opening for receiving the cylinder 20. The washer 70 has a top side 73 shown in FIG. 5 with a peripheral ring 74 shaped to rest against the lower side 67 of the second lower information indicating ring 60 and with a disk or part 76 which would prevent or inhibit rotation of the washer 70 with respect to the second information indicating ring 60.

The washer 70 has a central opening 78 which is aligned with the opening 32 in the top surface 28 of the cylinder 20 on which all of the parts are mounted. The opening 78 facilitates attachment of the following fastening element below the washer.

As shown in FIGS. 1, 2 and 5, there is an indicator element 82 on the periphery 84 of the washer 70 in a shape of a triangle pointing upwardly. The indicator element 82 may be aligned with a selected one of the weight or force resistance indicator numbers 68 for the fishing line then on the reel for that fishing rod. That alignment is obtained by rotation of the lower information ring 60 to move the number on the periphery 66 of the lower ring 60 that is selected for that particular fishing line above the indicator element 82 on the washer 70. The opposite side 72 of the disk shaped washer 70 faces down, away from the lower information ring 60. The washer cooperates with the following fastening element 90 at the end of the line.

The individual heights, along the axis of the indicator cylinder 20, of the parts assembled on the cylinder together add up to their combined heights on the cylinder 20, so that the cylinder supports both rings 40, 60 and receives the washer 70 at the bottom of the cylinder.

FIGS. 1, 2, 4 and 5 show a fastening element 90 below the washer 70. The fastening element 90 is rotated, e.g. like a nut, at a bolt 102 that extends down from the below described attachment piece 100 that is above the top end of the cylinder 20. In this embodiment, the bolt 102 extends down from that attachment piece 100 through the opening 32 in the cylinder, through the two information rings 40, 60 without contacting them, and then passes through the opening 84 through the washer 70, until the bolt thread 104 part is received in the mating screw thread in the opening 106 in the top view of the fastening element 90, as seen in FIG. 5. In FIG. 5, at the middle of the fastening element 90 is an opening 106 which defines a threaded connection for the bolt 102 that extends down from the attachment piece 100 into the opening 106. A washer and nut combination 107 is tightened by the bolt 102 against the element 90. The fastening element 90 has a projection or knob 112 that may be grasped manually and rotated to rotate the fastening element 90 to selectively tighten the parts on the cylinder 20 together or release those parts for relative movement or to permit separation of the parts, all by appropriate rotation of the fastening element with respect to the bolt.

The top surface 114 of the fastening element 90 faces up to and engages the underside 86 of the washer. As their surfaces engage, the fastening element 90 stops rotation of the washer 70, and the washer in turn presses on the rings 60, 40, so that the tightening of the fastening element 90 does not rotate either the washer or the rings.

The end cap system includes a cap 100 configured to clamp onto the butt end 130 of a standard fishing rod 132. The butt end of the rod may be generally cylindrical, or may be otherwise shaped. Other appropriate connectors to the butt end of the rod may be provided for the end cap. An example illustrated in FIGS. 1, 2, 3 and 5 is that of a tulip type connector 134 with resilient fingers 136 that are separated at 138 and that press inwardly against the butt end 130 of the rod and hold the end cap 120 and therefore the indicator assembly 10 on the rod 132. Other types of holding connectors for clamping or holding the indicator assembly to the rod 132 may be provided. In place of the tulip type connector, there may be an internally threaded device of complementary diameter to the butt end of the rod, or such a device with a rough internal surface to reduce the ability of the connector for relative movement with respect to the fishing rod 132, or something else to otherwise resist free movement of the indicator assembly with respect to the butt end of the fishing rod. Alternatively, that holding connector may be fixedly secured to the rod by a securement device. But, the latter reduces the ability to rapidly remove an indicator system from the rod 132 for any reason.

Referring to FIGS. 2 and 3, the bottom end 146 of that tulip shape connector 134 or other shape holding connector is a base configured to support the bolt head 148 and the bolt 102 that extends from the upper connector 100, through the cylinder 20 through the information rings 40, 60 on the cylinder 20, through the washer 70, and into the screw threaded opening 106 in the securing element 90.

When the above described parts are all assembled together, the indicator system is easily placed on the butt end of the fishing rod, by placing the tulip connector over the butt end of the rod. The indicator assembly would be held in place by the tulip connector 134 which has sufficient strength not to come off the butt end 130 during normal use of the rod.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An indicator assembly for attachment on a fishing rod to provide fishing line information concerning a fishing line used on the fishing rod, the indicator assembly comprising:

a cylinder having a peripheral surface configured for engaging and supporting information indicating rings, and for inhibiting rotation of each of the information indicating rings on the peripheral surface of the cylinder, without preventing the rotation of the information indicating rings on the cylinder;

the cylinder having a first end;

a first one of the information indicating rings being toward the first end of the cylinder and positioned on the peripheral surface of the cylinder; the first ring having a first surface provided with a first plurality of a first type of information concerning the fishing line, the first plurality of the first type of information being distributed around the first surface of the first information indicating ring;

the first information indicating ring being below the first indicator element;

a first indicator element toward the first end of the cylinder, the first indicator element being positioned and configured to provide a first indication by the first indicator element toward one of the first type of information concerning the fishing line which is then on the first surface of the first information indicating ring, the first indicator element being located and configured so that upon rotation of the first information indicating ring on the cylinder, first information elements on the first surface of the first information indicating ring are selectively rotated by the first information indicating ring to be at the first indicator element, whereby the first fishing line information on the first information indicating ring may be stored on the first ring on and is also accessible at the location of the first indicator element at the first ring;

a second one of the information indicating rings being positioned on the peripheral surface of the cylinder and below the first one of the information indicating rings and being rotatable around the cylinder;

the second one of the information indicating rings having a second surface provided with a second plurality of a second type of information concerning the fishing line, the second plurality of the second type of information being distributed around the second surface of the second information indicating ring, a second indicator element toward an opposite end of the cylinder from the first end of the cylinder; the second indicator element being positioned and configured to provide a second indication by the second indicator element toward one of the second type of information concerning the fishing line information then on the second information including ring;

the second indicator element being located and configured so that upon rotation of the second information indicating ring on the cylinder, second information elements on the second ring are selectively rotated by the second ring to be at the second indicator element, whereby the second fishing line information on the second information indicating ring may be stored on the second ring information indicating and is also accessible at the location of the second indicator element at the second ring;

a fastening element below the opposite end of the cylinder and below the second information indicating ring, the fastening element being configured for cooperating with the cylinder so that the fastening element connects all of the cylinder, the first and second information rings and the fastening element together to selectively fix the first and second information rings against rotation, and the fastening element is also operable to permit the rings to rotate on the cylinder.

2. The indicator assembly of claim 1, further comprising an attachment device attached to the cylinder in a manner such that the indicator assembly may be attached to the fishing rod and detached therefrom.

3. The indicator assembly of claim 2, further comprising a connecting part extending from the attachment device through the cylinder past the information indicating rings and into the fastening element, wherein the connecting part is configured to hold together all elements of the indicator assembly.

4. The indicator of claim 3, wherein the connecting part extending from the attachment device to the fastening element comprises a bolt having a thread thereon located at the fastening element and the fastening element having an opening that is threaded to mate with the thread on the bolt, wherein the bolt is tightened by rotation of the fastening element by a first direction of rotation and is loosened by opposite direction rotation.

5. The indicator assembly of claim 3, further comprising a washer disposed between the second information indicating ring and the fastening element, the fastening element engaging the washer in a manner such that rotation of the fastening element does not rotate the washer with respect to the second ring.

6. The indicator assembly of claim 5, wherein the second indicator element is on the washer.

7. The indicator assembly of claim 1, further comprising a second indicator element located and configured so that upon rotation of the second information indicating ring, information elements on the second ring are selectively rotated on the second ring to the second indicator element, whereby fishing line information may be stored on and accessible at the location of the second indicator at the second ring.

* * * * *